(12) United States Patent
Holm et al.

(10) Patent No.: US 8,385,436 B2
(45) Date of Patent: Feb. 26, 2013

(54) APPARATUS AND METHOD FOR MODIFYING TRANSMISSIONS ON SPECIFIED WIRELESS CHANNELS TO REDUCE INTERFERENCE WITH HIGHER-PRIORITY TRANSMITTERS

(75) Inventors: Henrik Holm, Lakeville, MN (US); Ramakrishna S. Budampati, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 1171 days.

(21) Appl. No.: 12/174,288

(22) Filed: Jul. 16, 2008

(65) Prior Publication Data
US 2010/0014599 A1    Jan. 21, 2010

(51) Int. Cl.
*H04K 1/10*  (2006.01)
*H04L 27/28* (2006.01)
(52) U.S. Cl. .......................................................... 375/260
(58) Field of Classification Search .................... 375/260
See application file for complete search history.

(56) References Cited

U.S. PATENT DOCUMENTS
2008/0261639 A1  10/2008  Sun et al.
2008/0268892 A1  10/2008  Hamdi et al.
2009/0207735 A1*  8/2009  Ben Letaief et al. ......... 370/237

OTHER PUBLICATIONS

Joseph W. Mwangoka, et al., "Robust End-to-End QoS Maintenance in Non-Contiguous OFDM Based Cognitive Radios", 2008 IEEE, pp. 2905-2909.*
Jordan D. Guffey, et al., "Agile Radio Implementation of OFDM Physical Layer for Dynamic Spectrum Access Research", 2007 IEEE, pp. 4051-4055.
Si Chen, et al., "Distributed Optimization of Cognitive Radios Employed in Dynamic Spectrum Access Networks", 2008 IEEE, 4 pages.
Rakesh Rajbanshi, et al., "Peak-to-Average Power Ratio Analysis for NC-OFDM Transmissions", 2007 IEEE, pp. 1351-1355.
Rakesh Rajbanshi, et al., "An Efficient Implementation of NC-OFDM Transceivers for Cognitive Radios", 2006 IEEE, 5 pages.
"Amplitude-shift keying", http://en.wikipedia.org/wiki/Amplitude-shft_keying, Sep. 23, 2008, 6 pages.
"Phase-shift keying", http://en.wikipedia.org/wiki/BPSK, Oct. 5, 2008, 15 pages.
Andrea J. Goldsmith, et al., "Variable-Rate Variable-Power MQAM for Fading Channels", IEEE Transactions on Communication, vol. 45, No. 10, Oct. 1997, p. 1218-1230.

* cited by examiner

*Primary Examiner* — David C. Payne
*Assistant Examiner* — Tanmay Shah (57) ABSTRACT

A method includes obtaining data to be transmitted wirelessly and detecting if any transmitting devices having a higher priority are currently using at least one of multiple wireless channels. The method also includes transmitting the data wirelessly over the multiple wireless channels in a first specified manner when no transmitting devices having the higher priority are detected. The method further includes transmitting at least a portion of the data wirelessly over the multiple wireless channels in a second specified manner when at least one transmitting device having the higher priority is detected. The data could normally be transmitted using OFDM. When a higher-priority transmitting device is detected, at least a portion of the data could be transmitted using a reduced transmit power and a reduced constellation size and/or larger error correcting code. One or more wireless channels associated with one of two quadrature components could also be suppressed.

21 Claims, 5 Drawing Sheets

APPARATUS AND METHOD FOR MODIFYING TRANSMISSIONS ON SPECIFIED WIRELESS CHANNELS TO REDUCE INTERFERENCE WITH HIGHER-PRIORITY TRANSMITTERS

TECHNICAL FIELD

This disclosure relates generally to wireless devices and more specifically to an apparatus and method for modifying transmissions on specified wireless channels to reduce interference with higher-priority transmitters.

BACKGROUND

Various wireless transmitters are often designed to operate using the same or similar frequencies. However, a licensed transmitter (such as a television broadcaster) may be licensed to use a particular frequency sub-band. Unlicensed transmitters are typically prevented from transmitting on that frequency sub-band in order to avoid interfering with the licensed transmitters' transmissions.

SUMMARY

This disclosure provides an apparatus and method for modifying transmissions on specified wireless channels to reduce interference with higher-priority transmitters.

In a first embodiment, a method includes obtaining data to be transmitted wirelessly. The method also includes detecting if any transmitting devices having a higher priority are currently using at least one of multiple wireless channels. The method further includes transmitting the data wirelessly over the multiple wireless channels in a first specified manner when no transmitting devices having the higher priority are detected. In addition, the method includes transmitting at least a portion of the data wirelessly over the multiple wireless channels in a second specified manner when at least one transmitting device having the higher priority is detected.

In a second embodiment, an apparatus includes a transceiver configured to transmit wireless signals over multiple wireless channels. The apparatus also includes a controller configured to detect if any transmitting devices having a higher priority are currently using at least one of the multiple wireless channels. The controller is also configured to initiate transmission of data wirelessly over the multiple wireless channels in a first specified manner when no transmitting devices having the higher priority are detected. The controller is further configured to initiate transmission of at least a portion of the data wirelessly over the multiple wireless channels in a second specified manner when at least one transmitting device having the higher priority is detected.

In a third embodiment, a computer readable medium includes a computer program embodied on the computer readable medium. The computer program includes computer readable program code for detecting if any transmitting devices having a higher priority are currently using at least one of multiple wireless channels. The computer program also includes computer readable program code for initiating transmission of data wirelessly over the multiple wireless channels in a first specified manner when no transmitting devices having the higher priority are detected. The computer program further includes computer readable program code for initiating transmission of at least a portion of the data wirelessly over the multiple wireless channels in a second specified manner when at least one transmitting device having the higher priority is detected.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
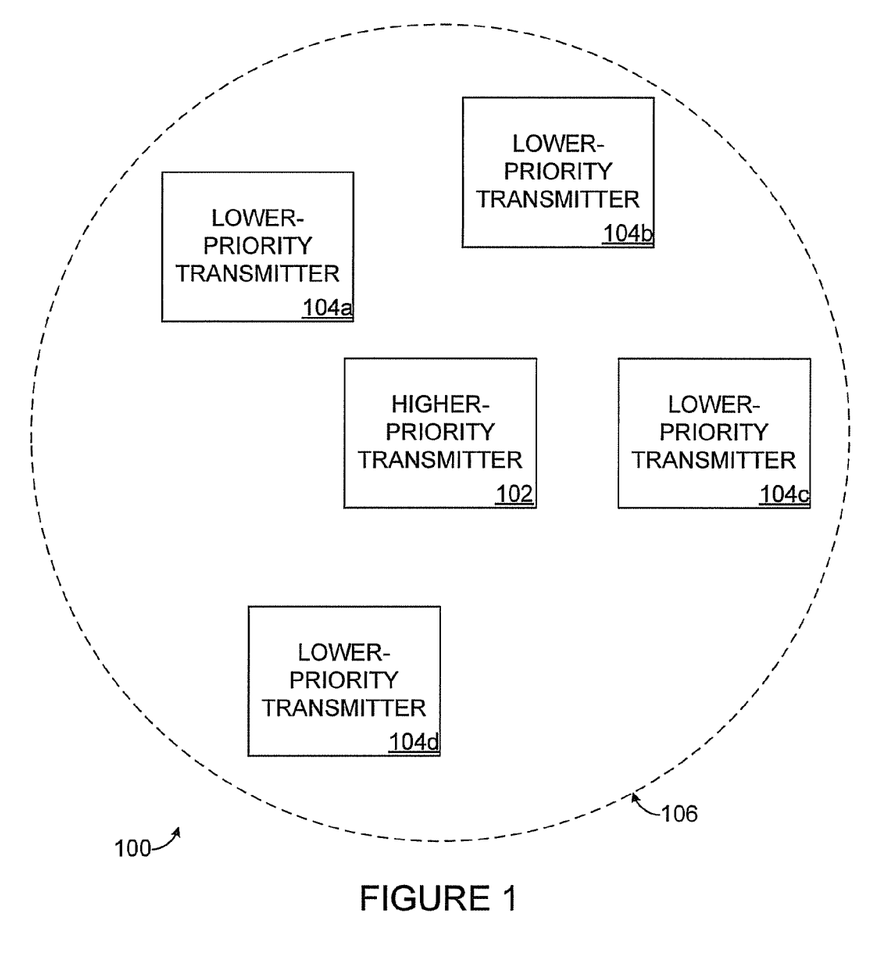
FIG. 1 illustrates an example communication system according to this disclosure.

FIG. 1 illustrates an example communication system 100 according to this disclosure. The embodiment of the communication system 100 shown in FIG. 1 is for illustration only. Other embodiments of the communication system 100 could be used without departing from the scope of this disclosure.

In this example embodiment, the communication system 100 includes at least one higher-priority wireless transmitter 102 and one or more lower-priority wireless transmitters 104a-104d. For example, the higher-priority wireless transmitter 102 could represent a licensed transmitter, and the lower-priority wireless transmitters 104a-104d could represent unlicensed transmitters. As a particular example, the higher-priority wireless transmitter 102 could represent a television broadcaster or other entity licensed to use at least one particular wireless channel, while the lower-priority wireless transmitters 104a-104d could represent other devices not licensed to use the wireless channel(s). In this example, since the transmitter 102 is licensed to use the particular wireless channel(s), the transmitter 102 is said to have a higher priority or right to use the wireless channel(s). Note that any other or additional criteria could also be used to determine the relative priorities of two or more transmitters.

The higher-priority wireless transmitter 102 in this example transmits wireless signals on one or more wireless channels, such as one or more frequency sub-bands. The higher-priority wireless transmitter 102 is associated with an interference contour 106, which defines the area where other transmitters (such as the lower-priority wireless transmitters 104a-104d) should not interfere with transmissions from the higher-priority wireless transmitter 102. While shown as a circle here, the interference contour 106 could have any suitable shape, such as a shape that is based at least partially on any man-made structures and natural features in the area around the higher-priority wireless transmitter 102.

In some systems, the lower-priority wireless transmitters 104a-104d cannot transmit on the wireless channel(s) used by the higher-priority wireless transmitter 102 during times when the transmitter 102 is using the wireless channel(s). When the wireless channels represent frequency sub-bands, these wireless channels are often called "silent" sub-bands. These channels represent sub-bands that the lower-priority wireless transmitters 104a-104d are prohibited from using when the higher-priority wireless transmitter 102 is transmitting.

In accordance with this disclosure, the lower-priority wireless transmitters 104a-104d are permitted to use one or more wireless channels that are currently in use by a higher-priority wireless transmitter 102. Rather than simply ceasing the use of any wireless channel being used by a higher-priority transmitter, the lower-priority wireless transmitters 104a-104d modify their transmissions and continue using those shared wireless channels. The modified transmissions may cause little or no interference with the transmissions from the higher-priority wireless transmitter 102 on the shared wireless channels.

The lower-priority wireless transmitters 104a-104d may use any suitable technique to modify their transmissions. However, simply reducing the transmit power of the lower-priority wireless transmitters 104a-104d is often not an ideal solution. This typically limits the range of the lower-priority transmitters 104a-104d and increases the error rate of transmitted data that is received at any receiving devices.

In some embodiments, the lower-priority wireless transmitters 104a-104d transmit data using symbols on a wireless channel, where the symbols typically represent multiple bits of data. In these embodiments, a lower-priority wireless transmitter 104a-104d could reduce its transmit power and lower the number of information bits transmitted per channel symbol on the wireless channel. In other embodiments, a lower-priority wireless transmitter 104a-104d could reduce its transmit power and increase the size of error correcting codes transmitted on the wireless channel, reducing the code rate (defined as the number of information bits divided by the total number of channel bits). In still other embodiments, a lower-priority wireless transmitter 104a-104d could use quadrature signals (I and Q components) to transmit different data, and one or more of the wireless channels for one of the quadrature components can be suppressed when a higher-priority transmitter 102 is using the wireless channel(s).

These represent three example ways that lower-priority wireless transmitters 104a-104d can modify their transmitted signals to enable communications to occur on a wireless channel when a higher-priority wireless transmitter 102 is using the wireless channel. Additional details regarding these techniques are provided below. Other techniques could be used, or any suitable combination of these or other techniques could be used. Each of the wireless transmitters 102, 104a-104d includes any suitable structure for transmitting wireless signals. One example embodiment of a wireless transmitter is shown in FIG. 2, which is described below.

Although FIG. 1 illustrates one example of a communication system 100, various changes may be made to FIG. 1. For example, the communication system 100 could include any number of higher-priority transmitters and lower-priority transmitters. Also, transmitters in the communication system 100 could have any suitable number of priorities, including more than two priorities. In addition, FIG. 1 illustrates one example operational environment where a lower-priority transmitter can modify its transmissions and continue transmitting on a wireless channel used by a higher-priority transmitter. This functionality could be used with any suitable device and in any suitable system.

Figure 2:
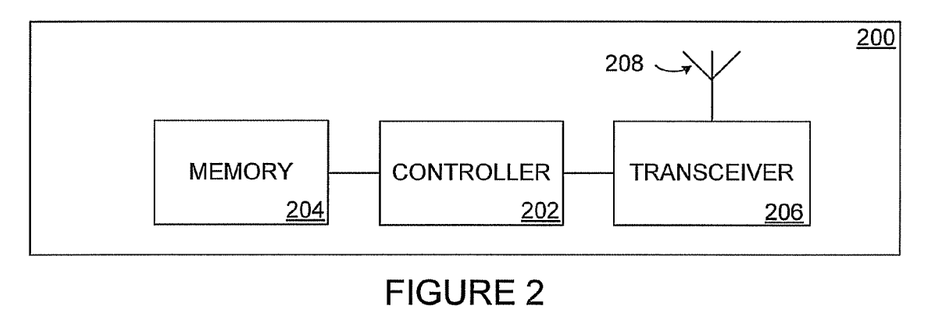
FIG. 2 illustrates an example wireless device in a communication system according to this disclosure.

FIG. 2 illustrates an example wireless device 200 in a communication system according to this disclosure. The wireless device 200 could, for example, represent the lower-priority devices 104a-104d in the communication system 100 of FIG. 1. The embodiment of the wireless device 200 shown in FIG. 2 is for illustration only. Other embodiments of the wireless device 200 could be used without departing from the scope of this disclosure.

As shown in FIG. 2, the wireless device 200 includes a controller 202, which controls the overall operation of the device 200. For example, the controller 202 could obtain data to be transmitted externally and provide the data to other component(s) in the wireless device 200 for transmission over a wireless network. The controller 202 could also receive data that is obtained over a wireless network, such as data from another wireless device 200.

The controller 202 could further detect transmissions of higher-priority transmitters in one or more wireless channels and modify the wireless device's transmissions. For example, as noted above, the controller 202 could lower the number of information bits transmitted per channel symbol on a sub-band, increase the size of error correcting codes transmitted on the sub-band, and/or suppress one or more sub-bands used with the I or Q component of quadrature signals. In this way, the controller 202 can help to facilitate transmissions on wireless channels even when higher-priority transmitters are operating on those wireless channels. The controller 202 could perform any of a wide variety of other functions in the wireless device 200, such as functions that depend on the particular type of wireless device or its field of use.

The controller 202 includes any hardware, software, firmware, or combination thereof for controlling the overall operation of the wireless device 200. As particular examples, the controller 202 could represent a processor, microprocessor, microcontroller, field programmable gate array, or other processing or control device.

A memory 204 is coupled to the controller 202. The memory 204 stores any of a wide variety of information used, collected, or generated by the wireless device 200. For example, the memory 204 could store information identifying the sub-bands or other wireless channels used by higher-priority transmitters. The memory 204 could also store the respective priorities of the wireless device 200 and other transmitters. The memory 204 could store any other or additional information. The memory 204 includes any suitable volatile and/or non-volatile storage and retrieval device(s).

The wireless device 200 also includes at least one wireless transceiver 206 and at least one antenna 208. The transceiver(s) 206 and antenna(s) 208 can be used to communicate wirelessly with other devices. For example, the transceiver(s) 206 and antenna(s) 208 allow the wireless device 200 to transmit data to one or more receiving devices and to receive data from one or more transmitting devices (note that a device can be both a transmitting and receiving device). As a particular example, the transceiver(s) 206 and antenna(s) 208 could allow the wireless device 200 to receive signals transmitted from higher-priority transmitters, which allows the controller 202 to determine whether any higher-priority transmitters are using a particular wireless channel.

The transceiver 206 includes any suitable structure for providing signals for wireless transmission and/or obtaining signals received wirelessly. The antenna 208 represents any suitable structure for transmitting and/or receiving wireless signals. In some embodiments, the transceiver 206 represents a radio frequency (RF) transceiver, and the antenna 208 represents an RF antenna. The transceiver 206 could also include a transmitter and a separate receiver.

Although FIG. 2 illustrates one example of a wireless device 200 in a communication system, various changes may be made to FIG. 2. For example, various components in FIG. 2 could be combined, subdivided, or omitted and additional components could be added according to particular needs. As a particular example, additional components could be added to the wireless device 200 to support any other functions to be performed by the wireless device 200, such as components for generating data transmitted wirelessly or using data received wirelessly.

FIGS. 3A through 3D illustrate a first example technique for modifying transmissions on specified wireless channels to reduce interference with higher-priority transmitters according to this disclosure. The technique shown in FIGS. 3A through 3D is for illustration only. Other techniques could be used without departing from the scope of this disclosure.

In FIGS. 3A through 3D, a lower-priority transmitter modifies its transmissions by (i) reducing the transmit power used to transmit signals on one or more wireless channels and (ii) reducing the information rate of the transmitted signals. In this way, even though the signals are transmitted with less power, the lower information rate may allow the lower-priority transmitter to achieve an acceptable range with an acceptable error rate. As a result, the lower-priority transmitter can continue transmitting signals without unduly interfering with a higher-priority transmitter.

Figure 3A:
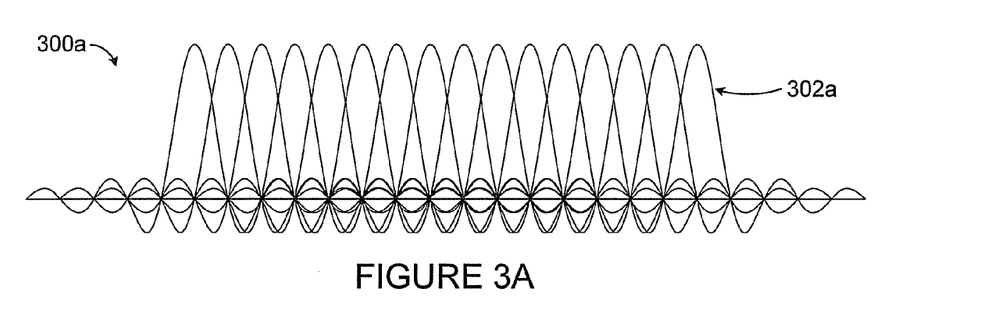
FIGS. 3A through 3D illustrate a first example technique for modifying transmissions on specified wireless channels to reduce interference with higher-priority transmitters according to this disclosure.

FIG. 3A illustrates a frequency spectrum 300a used during normal operation of the lower-priority transmitter. In this example, the spectrum 300a includes various signals 302a transmitted by the lower-priority transmitter. For example, these signals 302a could represent the signals transmitted on orthogonal sub-bands by the lower-priority transmitter. Here, the signals 302a are transmitted using a higher transmit power. The higher transmit power may be necessary, for example, due to the use of a larger constellation size and/or a smaller error correcting code contained in the transmitted data. A constellation generally represents a collection of symbols that can be transmitted over a channel. A larger constellation size means more symbols can be transmitted over a channel, so more information bits can be transmitted per symbol over the channel. This typically requires a higher transmit power in order to achieve a desired range and error rate. Similarly, an error correcting code can be used by a receiving device to correct errors in received data. A smaller error correcting code typically requires a higher transmit power so that fewer errors are contained in the received data.

Figure 3B:
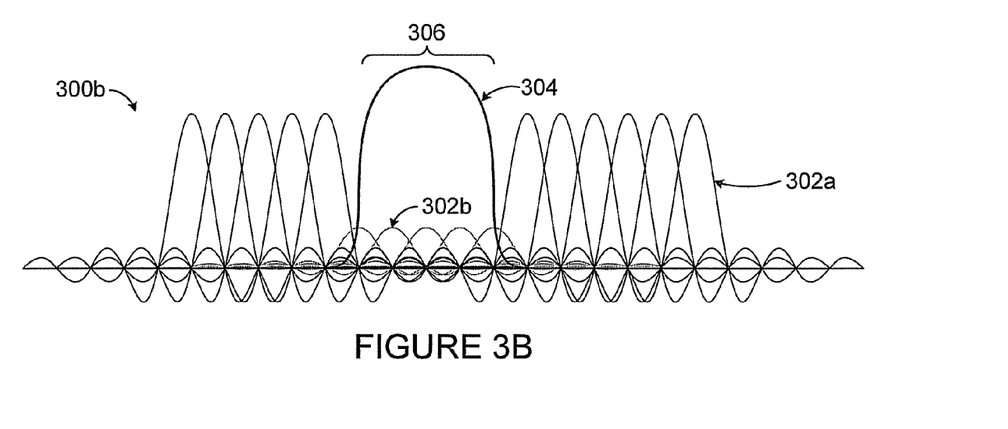

FIG. 3B illustrates a frequency spectrum 300b used during modified operation of the lower-priority transmitter. In FIG. 3B, a higher-priority transmitter is transmitting a signal 304 in a frequency range 306. In response, the lower-priority transmitter continues transmitting, but the lower-priority transmitter modifies its transmissions and transmits modified signals 302b within that frequency range 306. For example, the lower-priority transmitter can reduce its transmit power and use a smaller constellation size and/or a larger error correcting code in the signals 302b within the frequency range 306. The smaller constellation size allows less data to be transmitted over the wireless channel, and the lower-priority transmitter can achieve a desired range even with the reduced transmit power. The larger error correcting code similarly allows more errors (caused by the reduced transmit power) to be corrected at a receiving device, again allowing the lower-priority transmitter to achieve a desired range using the reduced transmit power.

Figure 3C:
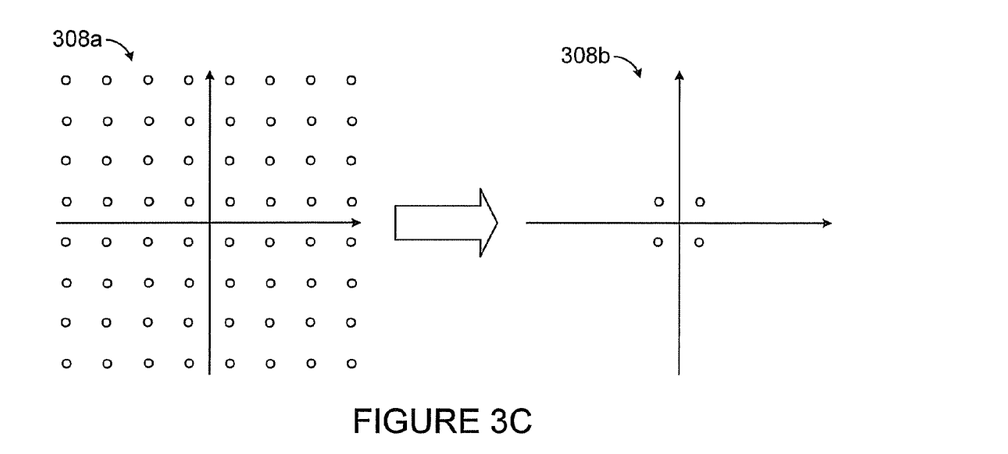
Figure 3D:
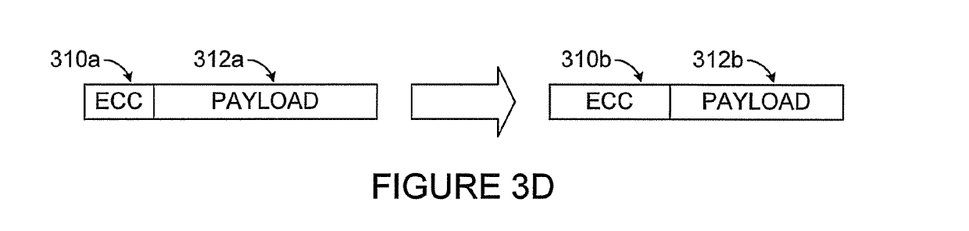

FIGS. 3C and 3D illustrate two ways in which the number of information bits on the wireless channel can be reduced in the frequency range 306. In particular, FIG. 3C illustrates the reduction of the constellation size in the frequency range 306 from a larger constellation 308a to a smaller constellation 308b. In this example, the larger constellation 308a is associated with a 64-QAM (quadrature amplitude modulation) signal, and the smaller constellation 308b is associated with a 4-QAM signal. Each symbol in the 64-QAM signal represents six bits of information, while each symbol in the 4-QAM signal represents two bits of information. As a result, by using the smaller constellation 308b in the frequency range 306, the lower-priority transmitter transmits less information over the wireless channel, but a lower transmit power can be used with the smaller constellation 308b to achieve a desired range or error rate.

FIG. 3D illustrates an increase in the amount of error correcting code contained in transmitted data. In this example, transmitted data (in signals 302a) includes a smaller error correcting code (ECC) 310a and a larger payload 312a. Within the frequency range 306, a larger error correcting code 310b and a smaller payload 312b are transmitted in signals 302b. By using a larger error correcting code 310b, the lower-priority transmitter transmits less information over the wireless channel, and errors associated with a lower transmit power can be corrected using the larger amount of error correcting code. A lower transmit power can be used with the larger error correcting code 312b to achieve a desired range or error rate.

A combination of these approaches can also be used. For example, in the frequency range 306, the lower-priority transmitter could reduce its constellation size and increase its error correcting code size. In all of these embodiments, the lower-priority transmitter is reducing the amount of informational bits transmitted over a wireless channel and taking other actions that allow the lower-priority transmitter to transmit on the same wireless channel as a higher-priority transmitter.

Although FIGS. 3A through 3D illustrate one example of a technique for modifying transmissions on specified wireless channels to reduce interference with higher-priority transmitters, various changes may be made to FIGS. 3A through 3D. For example, any suitable constellation sizes could be used by the transmitting device. Also, the relative sizes of the error correcting codes and payloads are for illustration only.

FIGS. 4A through 4D illustrate a second example technique for modifying transmissions on specified wireless channels to reduce interference with higher-priority transmitters. The technique shown in FIGS. 4A through 4D is for illustration only. Other techniques could be used without departing from the scope of this disclosure.

In FIGS. 4A through 4D, a lower-priority transmitter transmits data using both I and Q quadrature components on some wireless channels and only one of the quadrature components on other wireless channels. In some embodiments, for example, one quadrature component could be used to transmit higher-rate data, while another quadrature component could be used to transmit lower-rate rate. The higher-rate data could have a larger throughput and be highly variable. The lower-rate data could be transmitted with lower latency, such as when it is used for real-time voice communications, real-time process control, or other communications that require a minimum quality of service (QoS).

Figure 4A:
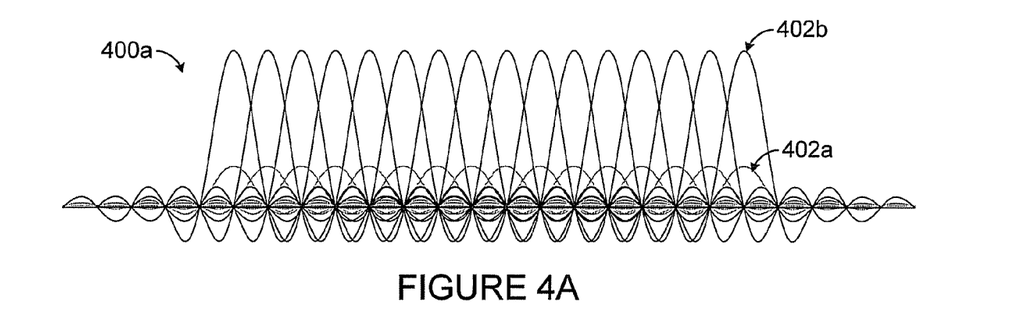
FIGS. 4A through 4D illustrate a second example technique for modifying transmissions on specified wireless channels to reduce interference with higher-priority transmitters according to this disclosure.

FIG. 4A illustrates a frequency spectrum 400a used during normal operation of the lower-priority transmitter. In this example, the spectrum 400a includes various signals 402a-402b transmitted by the lower-priority transmitter. Here, the transmitted signals include an I component (signals 402a)

and a Q component (signals 402b). For example, the Q component could be transmitted as orthogonal frequency division multiplexing (OFDM) signals, and data could be modulated on the Q component using multi-level amplitude shift keying (n-ASK). Orthogonal frequency division multiplexing involves the use of multiple orthogonal sub-bands (also called sub-carriers) by a transmitter. Each sub-band represents a different channel, and the transmitter modulates data onto each channel and transmits a signal over each channel. In contrast, the I component could be modulated using binary phase shift keying (BPSK), such as wideband BPSK.

Figure 4B:
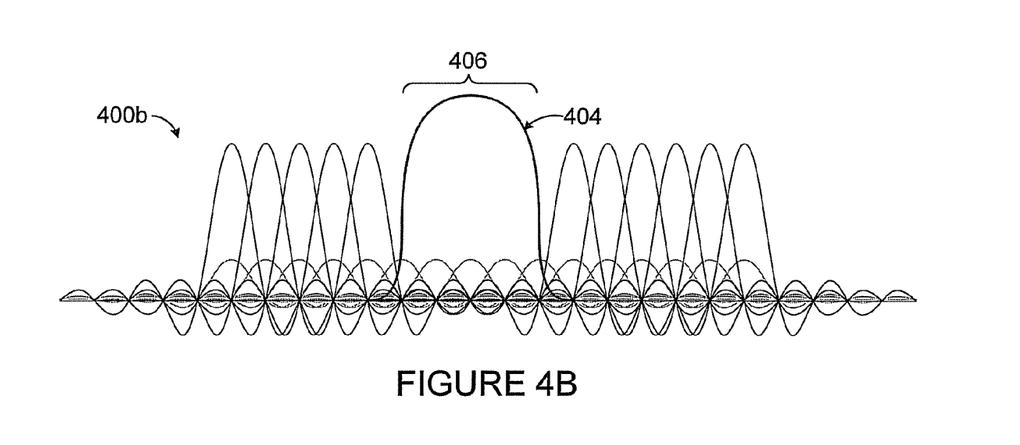

FIG. 4B illustrates a frequency spectrum 400b used during modified operation of the lower-priority transmitter. In FIG. 4B, a higher-priority transmitter is transmitting a signal 404 in a frequency range 406. In response, the lower-priority transmitter stops transmitting the Q component (signals 402b) within the frequency range 406. Here, the Q component's frequency sub-bands are suppressed in the frequency range 406, effectively providing non-contiguous OFDM (NC-OFDM) functionality. The I component (signals 402a) continues to be transmitted by the wireless device within the frequency range 406. Among other things, this could allow low-latency BPSK signals to be transmitted even when a higher-priority transmitter is operational and using a wireless channel. As a particular example, this could allow the lower-priority transmitter to transmit voice data (which often has minimum QoS and latency requirements) with a guaranteed throughput rate. Note here that the complexity of symbol and data allocation can be the same as with conventional NC-OFDM.

Figure 4C:
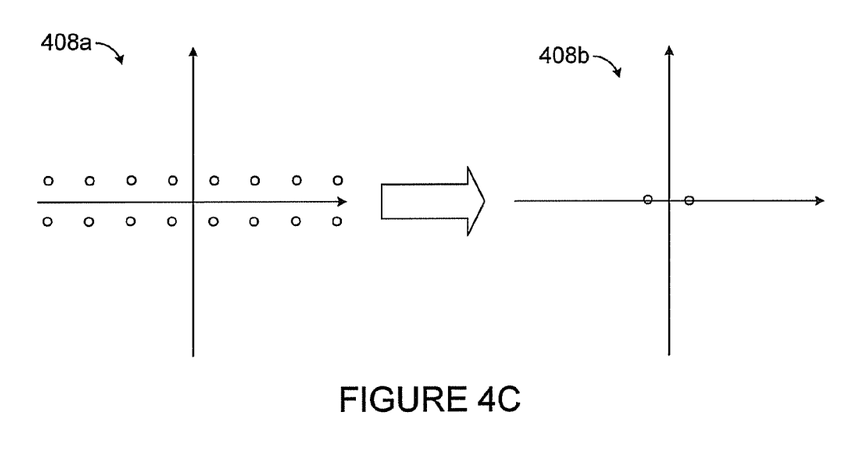
Figure 4D:
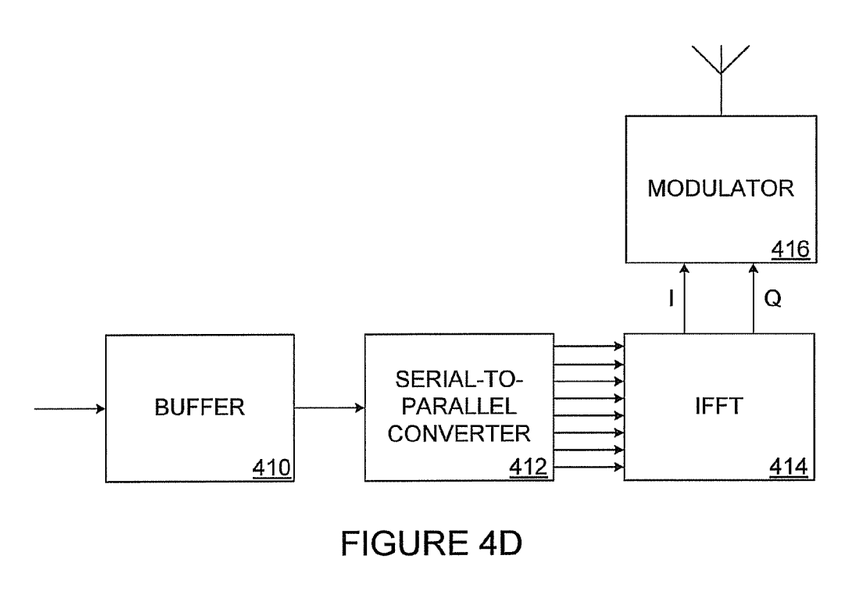

FIGS. 4C and 4D illustrate how one of the quadrature components can be suppressed within the frequency range 406. In FIG. 4C, a constellation 408a is used in frequency ranges not covered by higher-priority transmitters, and a constellation 408b is used in frequency ranges covered by higher-priority transmitters. As can be seen here, the Q component (represented along the vertical axis) of the transmissions is suppressed, while the I component (represented along the horizontal axis) continues. This allows the lower-priority device to continue transmitting data and provide various services, such as low-latency voice or real-time process control communications.

FIG. 4D illustrates additional details of a transceiver in the lower-priority transmitter (such as a transceiver 206). Here, the transceiver includes a buffer 410, which represents any suitable structure for receiving and storing data to be transmitted wirelessly. Data from the buffer 410 is provided to a serial-to-parallel converter 412, which represents any suitable structure for converting data from a serial format to a parallel format. The parallel data represents the frequency channels 402b.

Parallel data from the converter 412 is provided to an inverse Fast Fourier transform (IFFT) block 414. The IFFT block 414 implements an inverse Fourier transform to convert the parallel data into time-domain signals. The IFFT block 414 also helps to ensure that its output signals are orthogonal. The IFFT block 414 represents any suitable structure for performing an inverse Fourier transform. The signals output by the IFFT block 414 are provided to a modulator 416, which modulates data onto the signals output by the IFFT block 414. The modulator 416 includes any suitable structure for modulating data onto signals for transmission. The modulator 416 could, for example, include an n-ASK modulator and a BPSK modulator.

During normal operation, data flows to the buffer 410, which provides the data to the converter 412 for conversion. The data undergoes an inverse Fourier transform to produce I and Q components, which are modulated and transmitted by the modulator 416. During modified operation, the lower-priority transmitter can suppress one or more wireless channels for one of the quadrature components, and data normally sent on the suppressed channel(s) could be stopped or buffered in the buffer 410. Note that a wireless channel could be suppressed in any suitable manner. For example, the output of the serial-to-parallel converter 412 corresponding to a particular frequency channel may be suppressed.

Although FIGS. 4A through 4D illustrate another example of a technique for modifying transmissions on specified wireless channels to reduce interference with higher-priority transmitters, various changes may be made to FIGS. 4A through 4D. For example, any other suitable technique could be used here to suppress a wireless channel of a quadrature component. Also, the structure of the transceiver shown in FIG. 4D could be used to implement the technique shown in FIGS. 3A through 3D.

Figure 5:
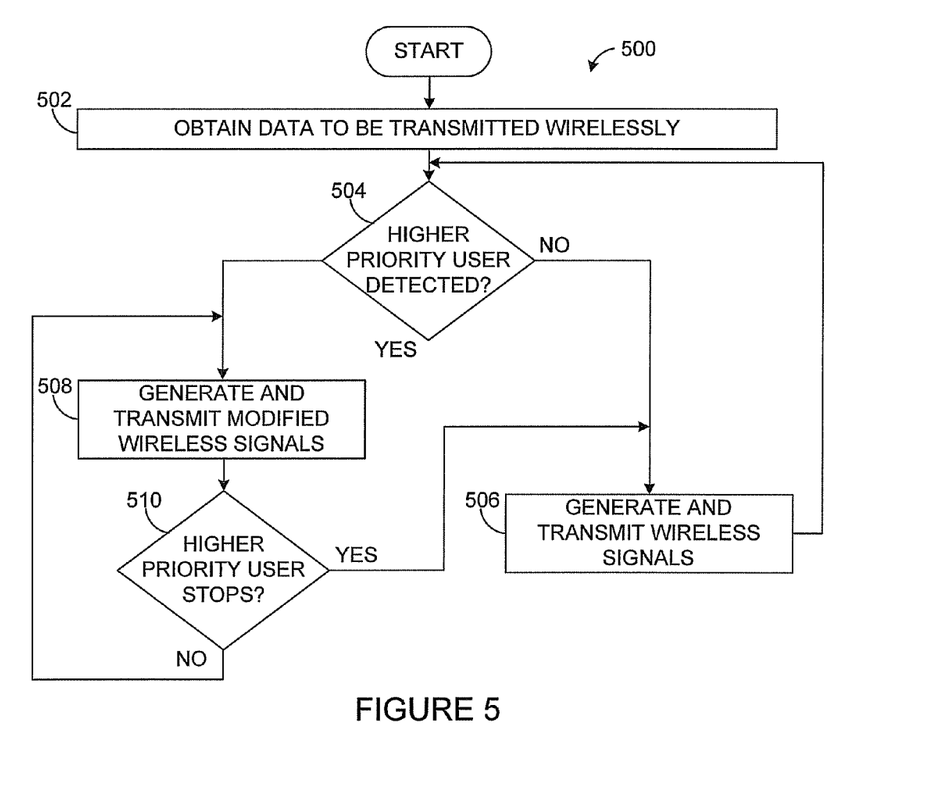
FIG. 5 illustrates an example method for modifying transmissions on specified wireless channels to reduce interference with higher-priority transmitters according to this disclosure.

FIG. 5 illustrates an example method 500 for modifying transmissions on specified wireless channels to reduce interference with higher-priority transmitters according to this disclosure. The embodiment of the method 500 shown in FIG. 5 is for illustration only. Other embodiments of the method 500 could be used without departing from the scope of this disclosure.

A transmitting device obtains data to be transmitted wirelessly at step 502. This could include, for example, a lower-priority wireless transmitter obtaining data from an external source or generating the data internally. The data could represent any suitable data to be transmitted wirelessly, such as voice data, real-time process control data, or other data.

The transmitting device determines whether any higher-priority transmitters are detected at step 504. This could include, for example, the transmitting device "listening" for or attempting to detect transmissions from higher-priority transmitters. If no higher-priority transmitters are detected, the transmitting device generates and transmits wireless signals containing the data at step 506. This could include, for example, the lower-priority wireless transmitter modulating the data onto orthogonal frequency sub-bands.

Otherwise, the transmitting device generates and transmits modified wireless signals at step 508. This could include, for example, the lower-priority wireless transmitter modulating the data onto one or more orthogonal frequency sub-bands using a smaller constellation size. This could also include the lower-priority wireless transmitter placing larger error correcting codes into data messages transmitted over one or more frequency sub-bands. This could further include the lower-priority wireless transmitter transmitting the wireless signals using a lower transmit power. In addition, this could include the lower-priority wireless transmitter suppressing one or more frequency channels for one of two quadrature components. The transmission of the modified wireless signals could continue until the transmitting device detects that the higher-priority transmitter stops transmitting at step 510. This could include, for example, the lower-priority wireless transmitter listening for transmissions from the higher-priority transmitters during times when the lower-priority wireless transmitter is not transmitting. When this condition is detected, the transmitting device can begin transmitting wireless signals without modification at step 506.

Although FIG. 5 illustrates one example of a method for modifying transmissions on specified wireless channels to reduce interference with higher-priority transmitters, various changes may be made to FIG. 5. For example, while shown as a series of steps, various steps in FIG. 5 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining data to be transmitted wirelessly;
   detecting if any transmitting devices having a higher priority are currently using at least one of multiple wireless channels;
   when no transmitting devices having the higher priority are detected, transmitting the data wirelessly in a first specified manner over the multiple wireless channels; and
   when at least one transmitting device having the higher priority is detected, transmitting at least a portion of the data wirelessly in a second specified manner over the multiple wireless channels including the at least one wireless channel currently used by the at least one transmitting device having the higher priority;
   wherein a first part of the data is transmitted in a same way in both the first and second manners over any wireless channel not currently used by the at least one transmitting device having the higher priority; and
   wherein a second part of the data is transmitted differently or not at all in the second manner over any wireless channel currently used by the at least one transmitting device having the higher priority.

2. The method of claim 1, wherein transmitting the data wirelessly in the first specified manner comprises transmitting the data over the multiple wireless channels using orthogonal frequency division multiplexing.

3. The method of claim 1, wherein transmitting at least the portion of the data wirelessly in the second specified manner comprises:
   reducing a transmit power used to transmit wireless signals over the at least one wireless channel currently used by the at least one transmitting device having the higher priority; and
   decreasing a constellation size associated with symbols transmitted over the at least one wireless channel currently used by the at least one transmitting device having the higher priority.

4. The method of claim 1, wherein transmitting at least the portion of the data wirelessly in the second specified manner comprises:
   reducing a transmit power used to transmit wireless signals over the at least one wireless channel currently used by the at least one transmitting device having the higher priority; and
   increasing a size of an error correcting code in a data message transmitted over the at least one wireless channel currently used by the at least one transmitting device having the higher priority.

5. The method of claim 1, wherein:
   transmitting the data wirelessly in the first specified manner comprises transmitting the data using two quadrature components; and
   transmitting at least the portion of the data wirelessly in the second specified manner comprises suppressing one of the quadrature components while transmitting the portion of the data using the other of the quadrature components over the at least one wireless channel currently used by the at least one transmitting device having the higher priority.

6. The method of claim 5, wherein:
   the suppressed quadrature component is used to transmit higher-rate data; and
   the unsuppressed quadrature component is used to transmit lower-rate data.

7. The method of claim 1, wherein the multiple wireless channels comprise frequency sub-bands.

8. The method of claim 1, wherein the at least one transmitting device having the higher priority comprises a licensed user authorized to transmit on the at least one wireless channel.

9. An apparatus comprising:
   a transceiver configured to transmit wireless signals over multiple wireless channels; and
   a controller configured to:
      detect if any transmitting devices having a higher priority are currently using at least one of the multiple wireless channels;
      when no transmitting devices having the higher priority are detected, initiate transmission of data wirelessly in a first specified manner over the multiple wireless channels; and
      when at least one transmitting device having the higher priority is detected, initiate transmission of at least a portion of the data wirelessly in a second specified manner over the multiple wireless channels including the at least one wireless channel currently used by the at least one transmitting device having the higher priority;
   wherein the apparatus is configured to transmit a first part of the data in a same way in both the first and second manners over any wireless channel not currently used by the at least one transmitting device having the higher priority; and wherein the apparatus is configured to transmit a second part of the data differently or not at all in the second manner over any wireless channel currently used by the at least one transmitting device having the higher priority.

10. The apparatus of claim 9, wherein the controller is configured to initiate the transmission of the data in the first specified manner using orthogonal frequency division multiplexing.

11. The apparatus of claim 9, wherein the controller is configured to initiate the transmission of at least the portion of the data wirelessly in the second specified manner using a reduced transmit power and using a reduced constellation size associated with symbols transmitted over the at least one wireless channel currently used by the at least one transmitting device having the higher priority.

12. The apparatus of claim 9, wherein the controller is configured to initiate the transmission of at least the portion of the data wirelessly in the second specified manner using a reduced transmit power and using a larger error correcting code in a data message transmitted over the at least one wireless channel currently used by the at least one transmitting device having the higher priority.

13. The apparatus of claim 9, wherein the controller is configured to:
 initiate the transmission of the data wirelessly in the first specified manner using two quadrature components; and
 initiate the transmission of at least the portion of the data wirelessly in the second specified manner by suppressing one of the quadrature components while initiating transmission of the portion of the data using the other of the quadrature components over the at least one wireless channel currently used by the at least one transmitting device having the higher priority.

14. The apparatus of claim 13, wherein:
 the suppressed quadrature component is used to transmit higher-rate data; and
 the unsuppressed quadrature component is used to transmit lower-rate data.

15. The apparatus of claim 9, wherein the multiple wireless channels comprise frequency sub-bands.

16. A non-transitory computer readable storage medium comprising a computer program embodied on the computer readable storage medium, the computer program comprising:
 computer readable program code for detecting if any transmitting devices having a higher priority are currently using at least one of multiple wireless channels;
 computer readable program code for, when no transmitting devices having the higher priority are detected, initiating transmission of data wirelessly in a first specified manner over the multiple wireless channels; and
 computer readable program code for, when at least one transmitting device having the higher priority is detected, initiating transmission of at least a portion of the data wirelessly in a second specified manner over the multiple wireless channels including the at least one wireless channel currently used by the at least one transmitting device having the higher priority;
 wherein the computer program is configured to initiate transmission of a first part of the data in a same way in both the first and second manners over any wireless channel not currently used by the at least one transmitting device having the higher priority; and
 wherein the computer program is configured to initiate transmission of a second part of the data differently or not at all in the second manner over any wireless channel currently used by the at least one transmitting device having the higher priority.

17. The computer readable storage medium of claim 16, wherein the computer readable program code for initiating the transmission of the data in the first specified manner comprises:
 computer readable program code for initiating the transmission of the data over the multiple wireless channels using orthogonal frequency division multiplexing.

18. The computer readable storage medium of claim 16, wherein the computer readable program code for initiating the transmission of at least the portion of the data in the second specified manner comprises:
 computer readable program code for initiating the transmission using a reduced transmit power and a reduced constellation size associated with symbols transmitted over the at least one wireless channel currently used by the at least one transmitting device having the higher priority.

19. The computer readable storage medium of claim 16, wherein the computer readable program code for initiating the transmission of at least the portion of the data in the second specified manner comprises:
 computer readable program code for initiating the transmission using a reduced transmit power and using a larger error correcting code in a data message transmitted over the at least one wireless channel currently used by the at least one transmitting device having the higher priority.

20. The computer readable storage medium of claim 16, wherein:
 the computer readable program code for initiating the transmission of the data wirelessly in the first specified manner comprises computer readable program code for initiating the transmission of the data using two quadrature components; and
 the computer readable program code for initiating the transmission of at least the portion of the data in the second specified manner comprises computer readable program code for suppressing one of the quadrature components while initiating transmission of the portion of the data using the other of the quadrature components over the at least one wireless channel currently used by the at least one transmitting device having the higher priority.

21. The method of claim 1, wherein:
 transmitting the data wirelessly in the first specified manner comprises transmitting a first quadrature component using orthogonal frequency division multiplexing and transmitting a second quadrature component using binary phase shift keying over the multiple wireless channels; and
 transmitting at least some of the data wirelessly in the second specified manner comprises transmitting the second quadrature component using binary phase shift keying without transmitting the first quadrature component over the at least one wireless channel currently used by the at least one transmitting device having the higher priority.

* * * * *